US010099438B2

(12) United States Patent
Bae

(10) Patent No.: US 10,099,438 B2
(45) Date of Patent: Oct. 16, 2018

(54) APPARATUS FOR MOLDING LENS FOR VEHICLE LAMP AND METHOD FOR MANUFACTURING LENS FOR VEHICLE LAMP USING THE SAME

(71) Applicant: HYUNDAI MOBIS CO., LTD., Seoul (KR)

(72) Inventor: Jin Woo Bae, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 183 days.

(21) Appl. No.: 15/134,169

(22) Filed: Apr. 20, 2016

(65) Prior Publication Data

US 2016/0332348 A1 Nov. 17, 2016

(30) Foreign Application Priority Data

May 12, 2015 (KR) .................. 10-2015-0066206

(51) Int. Cl.
*B29C 45/04* (2006.01)
*B29C 45/16* (2006.01)
(Continued)

(52) U.S. Cl.
CPC ...... *B29D 11/00009* (2013.01); *B29C 45/162* (2013.01); *B29C 45/1635* (2013.01); *B29C 45/2681* (2013.01); *B29D 11/0048* (2013.01); B29C 2045/1637 (2013.01); B29L 2011/0016 (2013.01); B29L 2031/30 (2013.01)

(58) Field of Classification Search
CPC ................................................ B29C 45/1615
See application file for complete search history.

(56) References Cited

U.S. PATENT DOCUMENTS

2015/0224723 A1* 8/2015 Hamkens ......... B29D 11/00432
264/1.36
2016/0297107 A1* 10/2016 Shim .................. B29D 11/0048

FOREIGN PATENT DOCUMENTS

| CN | 101554766 A | | 10/2009 |
| CN | 101844390 A | * | 9/2010 |
| KR | 10-0351546 B1 | | 9/2002 |

OTHER PUBLICATIONS

CN-101844390-A Google Patents Translation, Performed Mar. 16, 2018. (Year: 2018).*

* cited by examiner

*Primary Examiner* — Lisa L Herring
(74) *Attorney, Agent, or Firm* — Knobbe Martens Olson & Bear LLP

(57) ABSTRACT

An apparatus for molding a lens for a vehicle lamp may include: a lower mold including a first lower mold part for molding a primary injection-molded product and a second lower mold part for molding a secondary injection-molded product; a rotating mold including a first middle mold part for molding the middle part of the primary injection-molded product and a second middle mold part for molding the middle part of the secondary injection-molded product; a first movement prevention stopper fixing the primary injection-molded product; a second movement prevention stopper fixing the primary injection-molded product; a movement/rotation device moving the rotating mold and rotating the rotating mold; and an upper mold including a first upper mold part for molding the upper part of the primary injection-molded product and a second upper mold part for molding the upper part of the secondary injection-molded product.

5 Claims, 12 Drawing Sheets

(51) Int. Cl.
  *B29C 45/26*      (2006.01)
  *B29D 11/00*     (2006.01)
  *B29L 11/00*      (2006.01)
  *B29L 31/30*      (2006.01)

APPARATUS FOR MOLDING LENS FOR VEHICLE LAMP AND METHOD FOR MANUFACTURING LENS FOR VEHICLE LAMP USING THE SAME

CROSS-REFERENCES TO RELATED APPLICATIONS

The present application claims priority to Korean application number 10-2015-0066206, filed on May 12, 2015, which is incorporated by reference in its entirety.

BACKGROUND

The present disclosure relates to an apparatus for molding a lens for a vehicle lamp and a method for manufacturing a lens for a vehicle lamp using the same.

In general, a head lamp of a vehicle includes a light source, a reflecting plate, a blocking plate, and an aspheric lens. The light source is embedded in a housing, the reflecting plate reflects light generated through the light source, the blocking plate blocks the light reflected by the reflecting plate from being irradiated upward, and the aspheric lens forms a desired light pattern by refracting the light forward. When power is supplied to the light source embedded in the housing, the light source is turned on to generate light. Then, the generated light is irradiated toward the front through the aspheric lens, while being reflected by the reflecting plate.

The related technology is disclosed in Korean Patent No. 0351546 published on Aug. 23, 2002, and entitled "Method for manufacturing lens for vehicle lamp and apparatus for manufacturing lens for vehicle lamp".

SUMMARY

Embodiments of the present invention are directed to an apparatus for molding a lens for a vehicle lamp, which is capable of reducing the processes and time required for manufacturing a lens, and preventing a molding defect which may occur when a half-product of the lens is unstably seated and fixed, thereby stably securing the molding quality and optical performance of the product, and a method for manufacturing a lens for a vehicle lamp using the same.

In one embodiment, an apparatus for molding a lens for a vehicle lamp may include: a lower mold including a first lower mold part for molding a primary injection-molded product of a lens for a vehicle lamp and a second lower mold part for molding a secondary injection-molded product; a rotating mold being in contact with the lower mold, and including a first middle mold part for molding the middle part of the primary injection-molded product and a second middle mold part for molding the middle part of the secondary injection-molded product; a first movement prevention stopper installed in the rotating mold so as to be moved toward the first middle mold part, and fixing the primary injection-molded product to the rotating mold; a second movement prevention stopper installed in the rotating mold so as to be moved toward the second middle mold, and fixing the primary injection-molded product to the rotating mold; a movement/rotation device moving the rotating mold to be coupled to or separated from the lower mold, and rotating the rotating mold such that the first middle mold part and the second middle mold part alternately come in contact with the first lower mold part and the second lower mold part; and an upper mold including a first upper mold part for molding the upper part of the primary injection-molded product and a second upper mold part for molding the upper part of the secondary injection-molded product.

The lens may include: a primary molded lens part forming a part of a lens part which refracts light irradiated from a light source, and having a lower part of which the shape corresponds to the first lower mold part and an upper part of which the shape corresponds to the first upper mold part; an assembling bump formed on the primary molded lens part, having a lower part of which the shape corresponds to the first middle mold part and the second middle mold part and an upper part of which the shape corresponds to the first upper mold part, and placed against the rotating mold while being in contact with the first and second movement prevention stoppers; and a secondary molded lens part forming the lens part with the primary molded lens part, and having a lower part of which the shape corresponds to the second lower mold part and an upper part of which the shape corresponds to the second upper mold part.

The lower mold may include: a lower disk; a first lower core coupled to the lower disk, forming the first lower mold part, and having an upper part of which the shape corresponds to the lower part of the primary molded lens part; and a second lower core arranged on the lower disk so as to be separated from the first lower core, forming the second lower mold part, and having an upper part of which the shape corresponds to the lower part of the second molded lens part.

The rotating mold may include: a rotating disk moved and rotated by the movement/rotation device; a first middle hole part formed through the rotating disk, forming the first middle mold part, and having an upper edge part of which the shape corresponds to the bottom of the assembling bump; a second middle hole part formed through the rotating disk so as to be separated from the first middle hole part, forming the second middle mold part, and having an upper edge part of which the shape corresponds to the bottom of the assembling bump; a first stopper installation part formed outside the first middle hole part, and having the first movement prevention stopper installed therein such that the first movement prevention stopper is moved in and out of the first middle hole part; and a second stopper installation part formed outside the second middle hole part, and having the second movement prevention stopper installed therein such that the second movement prevention stopper is moved in and out of the second middle hole part.

The first middle hole part may include: a core insertion part forming a path into which the first lower core is inserted, and placed against the first lower core; and an assembling bump molding part formed at the top of the core insertion part so as to communicate with the core insertion part, and having a shape corresponding to the lower part of the assembling bump.

The first movement prevention stopper may include: a stopper body installed on the lower mold and slid to come in contact with the assembling bump; and an actuator reciprocating the stopper body between the inside and outside of the first stopper installation part.

The upper mold may include: an upper disk; a first upper core coupled to the upper disk, forming the first upper mold part, and having a lower part of which the shape corresponds to the upper part of the primary molded lens part; a second upper core arranged on the upper disk so as to be separated from the first upper core, forming the second upper mold part, and having a lower part of which the shape corresponds to the upper part of the secondary molded lens part; an upper bump molding part formed at the edge part of the first upper mold part so as to protrude downward, and having a shape corresponding to the upper part of the assembling bump while facing the first or second middle mold part; and a fixing part formed at the edge part of the second upper mold part so as to protrude downward, and placed against the assembling bump in a state where the second upper core is connected to the rotating mold.

The movement/rotation device may include: a rotating shaft connected to the rotating mold through the lower mold or the upper mold; a movement device moving the rotating shaft such that the rotating mold is placed against the lower mold or separated from the lower mold; and a rotation device rotating the rotating shaft.

In another embodiment, a method for manufacturing a lens for a vehicle lamp may include: arranging a lower mold, a rotating mold, and an upper mold in a vertical direction; connecting the lower mold, the rotating mold, and the upper mold to each other; forming a primary injection-molded product by injecting a molten injection material into a first molding chamber formed in one sides of the lower mold, the rotating mold, and the upper mold; fixing the primary injection-molded product to the rotating mold by moving a movement prevention stopper installed in the rotating mold such that the movement prevention stopper comes in contact with the primary injection-molded product; rotating the rotating mold to move the primary injection-molded product between the other sides of the lower mold and the upper mold; connecting the lower mold, the rotating mold, and the upper mold to each other such that the primary injection-molded product is positioned in a second molding chamber formed between the other sides of the lower mold and the upper mold; and forming a secondary injection-molded product by injecting a molten injection material into the second molding chamber.

The fixing of the primary injection-molded product to the rotating mold may include: exposing the top of the primary injection-molded product by separating the upper mold from the rotating mold; and sliding the movement prevention stopper to come in contact with the top of the primary injection-molded product.

The connecting of the lower mold, the rotating mold, and the upper mold to each other such that the primary injection-molded product is positioned in the second molding chamber may include: lowering the rotating mold to be connected to the lower mold; retreating the movement prevention stopper from the primary injection-molded product; and connecting the upper mold to the rotating mold.

The rotating of the rotating mold may include: separating the rotating mold from the lower mold; and rotating the rotating mold at a preset angle.

While the secondary injection-molded product is formed by injecting a molten injection material into the second molding chamber, the primary injection-molded product may be simultaneously formed by injecting a molten injection material into the first molding chamber.

DESCRIPTION OF EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

When an aspheric lens for a vehicle lamp is manufactured, multi-injection molding is applied in order to shorten the time required for cooling an injection-molded product. However, when a lens is manufactured by the multi-injection molding, the lens is passed through a series of processes of forming a primary injection-molded product in a primary injection mold, ejecting the primary injection-molded product from the primary injection mold, storing the primary injection-molded product, and carrying and seating the primary injection-molded product into a secondary injection mold. Thus, this method has a limitation in reducing the manufacturing process and time.

In one example of an injection molding apparatus, the apparatus performs primary injection molding and secondary injection molding in one mold. However, since the apparatus has a structure that a primary injection mold and a secondary injection mold are simply connected to each other, the apparatus goes through a process of cooling and ejecting a primary injection-molded product and inserting the primary injection-molded product into the secondary injection mold. Thus, the apparatus can improve the space utilization, but has a limitation in reducing the manufacturing process or time.

In order to seat and fix the primary injection-molded product into the secondary injection mold, the primary injection-molded product includes a flange part having a hole or pin formed thereon, and the secondary injection-molded product includes a flange fixing part to which the hole and pin are coupled. However, due to the contraction or deformation of the flange part or a processing error of the mold, the primary injection-molded product may be unstably seated in the secondary injection mold.

Furthermore, when the primary injection-molded product is forced into the secondary injection mold, an ejection defect such as scratch or crack may occur, and when the primary injection-molded product is loosely fitted to the secondary injection-molded product, a molding defect may occur. In this case, each product may have a different quality.

Figure 1:
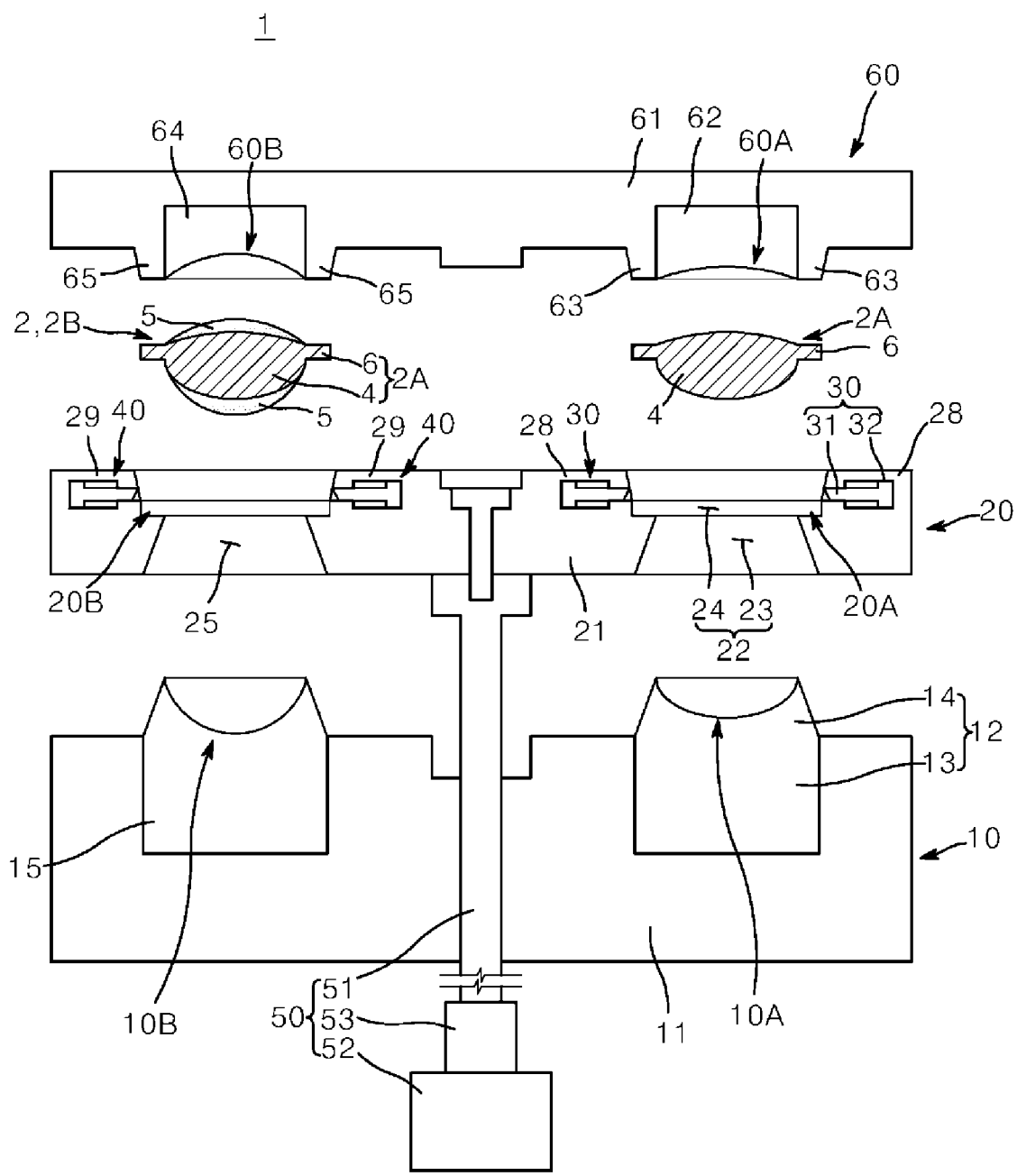
FIG. 1 is a schematic cross-sectional view of an apparatus for molding a lens for a vehicle lamp in accordance with an embodiment of the present invention.
Figure 2:
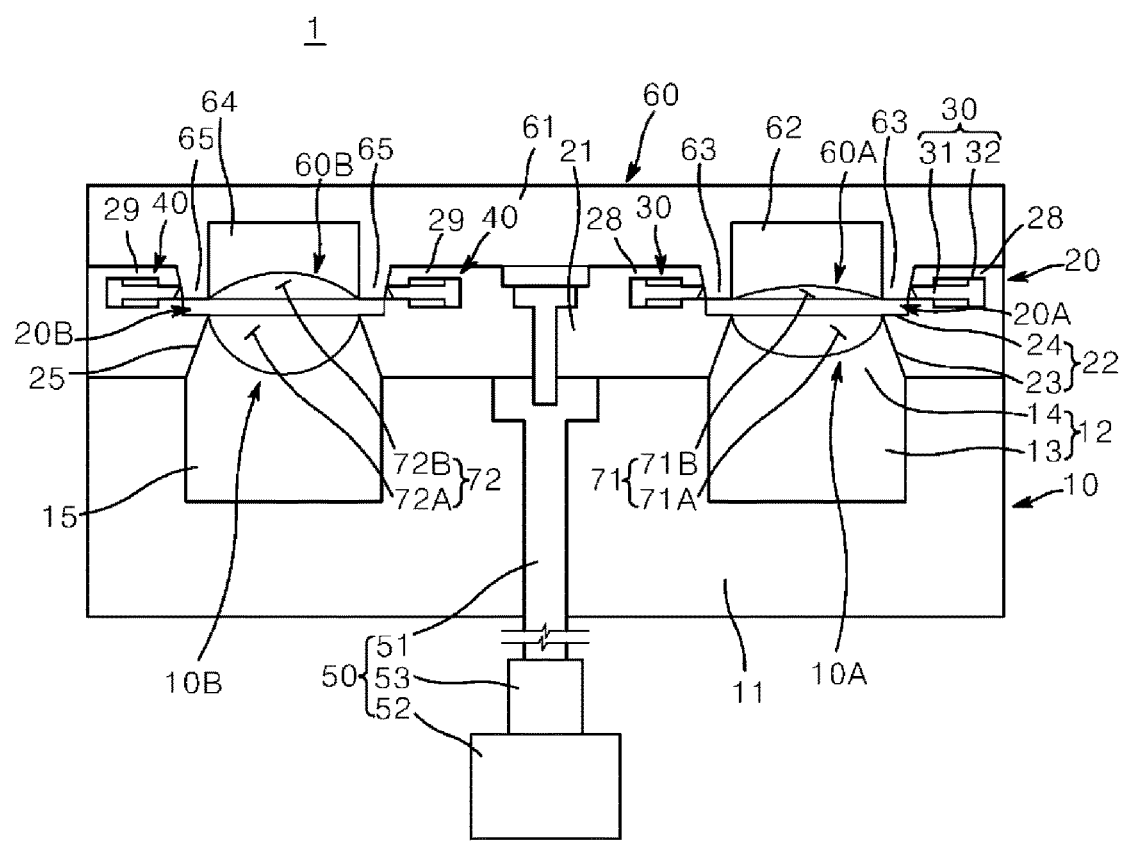
FIG. 2 is a schematic cross-sectional view illustrating a state in which an upper mold, a rotating mold and a lower mold are connected to each other in the apparatus for molding a lens for a vehicle lamp in accordance with the embodiment of the present invention.

Referring to FIGS. 1 and 2, the apparatus 1 for molding a lens for a vehicle lamp in accordance with the embodiment of the present invention may include a lower mold 10, a rotating mold 20, a first movement prevention stopper 30, a second movement prevention stopper 40, a movement/rotation device 50, and an upper mold 60.

Before the apparatus 1 for molding a lens for a vehicle lamp in accordance with the embodiment of the present invention is described, the structure and shape of a lens 2 for a vehicle lamp, which is to be manufactured through the apparatus 1 for molding a lens for a vehicle lamp in accordance with the embodiment of the present invention, will be described.

Figure 12:
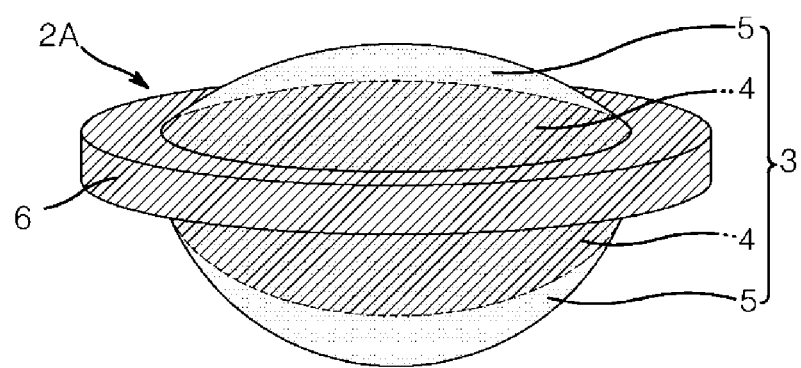
FIG. 12 is a perspective view illustrating an example of a lens manufactured through the apparatus for molding a lens for a vehicle lamp in accordance with the embodiment of the present invention.

Referring to FIG. 12, the lens 2 for a vehicle lamp may include a lens part 3 and an assembling bump 6. The lens part 3 may refract light irradiated from a light source, and the assembling bump 6 may be formed at the edge part of the lens part 3. The assembling bump 6 may be formed in a stepped or protruding shape so as to be coupled to the main body of a vehicle lamp, for example, a front cover.

A primary injection-molded product 2A may have a shape in which a part of the lens part 3 is integrally connected to the assembling bump 6, and a secondary injection-molded product 2B may have a shape in which another part or the other part of the lens part 3 is integrally connected to the primary injection-molded product 2A. In the present embodiment, suppose that the secondary injection-molded product 2B has the same shape as a complete product of the lens 2.

The primary injection-molded product 2A may include a primary molded lens part 4 and the assembling bump 6. The primary molded lens part 4 may form a part of the lens part 3, and have a thickness corresponding to a part (for example, $d_1$) of the lens part 3 having a preset thickness (for example, $d=d_1+d_2$). The assembling bump 6 may be formed at the edge part of the primary molded lens part 4 so as to protrude in the radial direction.

The secondary injection-molded product 2B may include the primary injection-molded product 2A and a secondary molded lens part 5 which is additionally formed on the primary injection-molded product 2A. The secondary molded lens part 5 may be integrally coupled to one surface or both surfaces of the primary molded lens part 4, and formed to a thickness corresponding to the other part (for example, $d_2$) of the lens part 3. The primary injection-molded product 2A and the secondary injection-molded product 2B may be formed of the same material. FIG. 12 illustrates an example of the lens 2 in which the secondary molded lens part 5 is coupled to both surfaces of the primary molded lens part 4.

Hereafter, when the apparatus 1 for molding a lens for a vehicle lamp in accordance with the embodiment of the present invention is described with reference to FIGS. 1 to 11, the structure of FIG. 12, in which the secondary molded lens part 5 is coupled to both surfaces of the primary molded lens part 4 will be taken as an example for description.

The lower mold 10 is an element for forming the lower parts of the primary and secondary injection-molded products 2A and 2B of the lens 2 for a vehicle lamp, or specifically a part of the lens part 3, which is positioned at the bottom of the assembling bump 6. The lower mold 10 may include a first lower mold part 10A for forming the primary injection-molded product 2A and a second lower mold part 10B for forming the secondary injection-molded product 2B. The first lower mold part 10A and the second lower mold part 10B may form a primary injection-molding surface and a secondary injection-molding surface of the lower mold 10, respectively.

The rotating mold 20 is an element for forming the middle parts of the primary and secondary injection-molded products 2A and 2B, or specifically the assembling bump 6. The rotating mold 20 may come in contact with the top of the lower mold 10. The rotating mold 20 may include a first middle mold part 20A for forming the middle part of the primary injection-molded product 2A and a second middle mold part 20B for forming the middle part of the secondary injection-molded product 2B. The first middle mold part 20A and the second middle mold part 20B may form a primary injection-molding surface and a secondary injection-molding surface of the rotating mold 20, respectively.

The first movement prevention stopper 30 is an element for fixing the primary injection-molded product 2A seated in the first middle mold part 20A to the rotating mold 20. The first movement prevention stopper 30 may be moved to be in contact with the primary injection-molded product 2A, and fix the primary injection-molded product 2A on the rotating mold 20. The second movement prevention stopper 40 is an element for fixing the primary injection-molded product 2A seated in the second middle mold part 20B to the rotating mold 20. The second movement prevention stopper 40 may be moved to be in contact with the primary injection-molded product 2A, and fix the primary injection-molded product 2A on the rotating mold 20.

The movement/rotation device 50 is an element for linearly moving or rotating the rotating mold 20. The movement/rotation device 50 may move the rotating mold 20 to be connected to or separated from the lower mold 10, and rotate the rotating mold 20 such that the first and second middle mold parts 20A and 20B alternately come in contact with the first and second lower mold parts 10A and 10B.

The upper mold 60 is an element for forming the upper parts of the primary and secondary injection-molded products 2A and 2B, or specifically a part of the lens part 3, which is positioned at the top of the assembling bump 6. The upper mold 60 may come in contact with the top of the rotating mold 20. The upper mold 60 may include a first upper mold part 60A for forming the upper part of the primary injection-molded product 2A and a second upper mold part 60B for forming the upper part of the secondary injection-molded product 2B. The first upper mold part 60A and the second upper mold part 60B may form a primary injection-molding surface and a second injection-molding surface of the upper mold 60, respectively.

Referring to FIGS. 1 and 2, the lower mold 10 in accordance with the embodiment of the present invention may include a lower disk 11, a first lower core 12 and a second lower core 15.

The lower disk 11 is an element forming a base in which the first and second lower cores 12 and 15 are installed. The first lower core 12, which forms the first lower mold part 10A, may be installed on the lower disk 11 such that the upper part thereof is exposed. The upper part of the first lower core 12 may have a shape corresponding to the lower part of the primary molded lens part 4. The first lower core 12 in accordance with the embodiment of the present invention may include a disk coupling part 13 and a connection molding part 14.

The disk coupling part 13, which is coupled to the lower disk 11, may be positioned under the top surface of the lower disk 11. The connection molding part 14, which protrudes upward from the lower disk 11, may be formed to be connected to the top of the disk coupling part 13. As illustrated in FIG. 2, the connection molding part 14 may be inserted into the rotating mold 20 in a state where the lower mold 10 and the rotating mold 20 are connected to each other. The upper part of the connection molding part 14 may have a shape corresponding to the lower part of the primary molded lens part 4.

The second lower core 15, which forms the second lower mold part 10B, may be arranged on the lower disk 11 so as to be separated from the first lower core 12. The first and second lower cores 12 and 15 may be arranged at the same distance from the center of rotation of the rotating mold 20. In embodiments, the first and second lower cores 12 and 15 may be arranged in one circle of which the center is set to the center of rotation of the rotating mold 20. For example, the first and second lower cores 12 and 15 may be arranged to face each other, with an angle difference of 180° therebetween based on the center of rotation of the rotating mold 20.

The upper part of the second lower core 15 may have a shape corresponding to the lower part of the secondary molded lens part 5. Since the upper part of the second lower core 15 has a shape corresponding to the lower part of the secondary molded lens part 5 and the second lower core 15 has the same structure as the first lower core 12 including the disk coupling part 13 and the connection molding part 14, the duplicated descriptions thereof are omitted herein.

Referring to FIGS. 1 and 2, the rotating mold 20 in accordance with the embodiment of the present invention may include a rotating disk 21, a first middle hole part 22, a second middle hole part 25, a first stopper installation part 28, and a second stopper installation part 29.

The rotating disk 21, which is moved and rotated by the movement/rotation device 50, may be arranged over the lower mold 10.

The first middle hole part 22, which forms the first middle mold part 20A, may be formed through the rotating disk 21 so as to be positioned right above the first lower core 12. The upper edge part of the first middle hole part 22 may have a shape corresponding to the assembling bump 6, or specifically a shape corresponding to the bottom and circumference of the assembling bump 6. The first middle hole part 22 in accordance with the embodiment of the present invention may include a core insertion part 23 and an assembling bump molding part 24.

The core insertion part 23 may form a path through which the first lower core 12 is inserted, and the first lower core 12 may be placed against the inner surface of the core insertion part 23. When the lower mold 10 and the rotating mold 20 are connected to each other, the connection molding part 14 protruding upward from the lower disk 11 may be inserted into the core insertion part 23, and placed against the inner surface of the core insertion part 23 in a state where the lower mold 10 and the rotating mold 20 are completely connected to each other.

The core insertion part 23 of the rotating mold 20 and the connection molding part 14 of the lower mold 10 may have a shape of which the width decreases toward the top. Thus, when the rotating mold 20 is moved downward, the connection molding part 14 may be inserted upward into the core insertion part 23, and when the rotating mold 20 is moved upward, the connection molding part 14 may be easily retreated downward to the outside of the core insertion part 23.

The assembling bump molding part 24, which forms an injection-molding surface of the assembling bump 6 or the first middle mold part 20A, may have a shape corresponding to the assembling bump 6, or specifically a shape corresponding to the bottom surface and circumference of the assembling bump 6, while communicating with the top of the core insertion part 23.

The second middle hole part 25, which forms the second middle mold part 20B, may be formed through the rotating disk 21 so as to be positioned right above the second lower core 15. Since the second middle hole part 25 has the same shape as the first middle hole part 22, the duplicated descriptions thereof are omitted herein.

The first stopper installation part 28, in which the first movement prevention stopper 30 is installed, may be formed outside the first middle hole part 22. In the present embodiment, the first stopper installation part 28 may be formed in the rotating disk 21 so as to be extended in the horizontal direction, and have a hollow structure in which the first movement prevention stopper 30 is inserted and installed. At this time, an end of the first stopper installation part 28 may communicate with the first middle hole part 22, such that an end of the first movement prevention stopper 30 can be moved in and out of the first middle hole part 22 in a state where the first movement prevention stopper 30 is inserted and installed in the first stopper installation part 28.

In the present embodiment, the first stopper installation part 28 may have a hole or groove shape. However, as long as the first movement prevention stopper 30 can be fixed and installed at a normal position, the first stopper installation part 28 is not limited to a specific structure and shape. For example, the first stopper installation part 28 may include a fixing cover which is detachably coupled to the rotating disk 21 by a fastening member such as a bolt, while covering the top of the first movement prevention stopper 30.

The second stopper installation part 29, in which the second movement prevention stopper 40 is installed, may be formed outside the second middle hole part 25. In the present embodiment, the second stopper installation part 29 may be formed in the rotating disk 21 so as to be extended in the horizontal direction, and have a hollow structure in which the second movement prevention stopper 40 can be inserted and installed. At this time, an end of the second stopper installation part 29 may communicate with the second middle hole part 25, such that an end of the second movement prevention stopper 40 can be moved in and out of the second middle hole part 25 in a state where the second movement prevention stopper 40 is inserted and installed in the second stopper installation part 29.

In the present embodiment, the second stopper installation part 29 may have a hole or groove shape. However, as long as the second movement prevention stopper 40 can be fixed and installed at a normal position, the second stopper installation part 29 is not limited to a specific structure and shape. For example, the second stopper installation part 29 may include a fixing cover which is detachably coupled to the rotating disk 21 by a fastening member such as a bolt, while covering the top of the second movement prevention stopper 40.

Referring to FIGS. 1 and 2, the first movement prevention stopper 30 in accordance with the embodiment of the present invention may include a stopper body 31 and an actuator 32, and a plurality of first movement prevention stoppers 30 may be installed at a plurality of spots.

Figure 4:
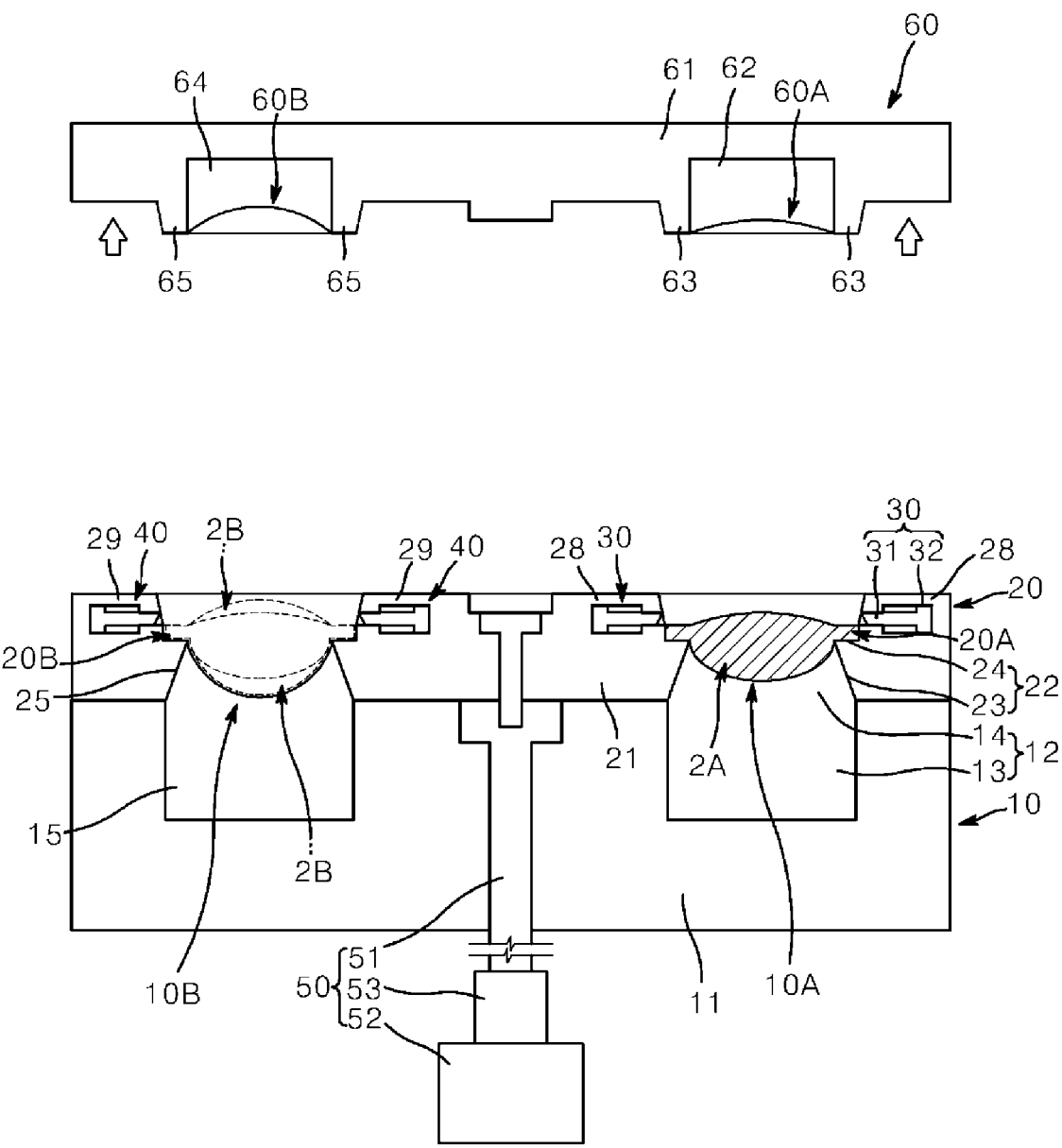
FIG. 4 is a conceptual view illustrating a state in which the upper mold is separated from the rotating mold in the apparatus for molding a lens for a vehicle lamp in accordance with the embodiment of the present invention.

The stopper body 31 is an element which is slid toward the primary injection-molded product 2A so as to come in contact with the top surface of the assembling bump 6. As illustrated in FIG. 4, when the stopper body 31 is slid toward the primary injection-molded product 2A, the stopper body 31 may come in contact with the top surface of the assembling bump 6, and pressurize the assembling bump 6 downward against the bottom surface of the assembling bump molding part 24. When the stopper body 31 is slid to be separated from the primary injection-molded product 2A, the stopper body 31 may be separated from the top surface of the assembling bump 6.

The stopper body 31 is not limited to a specific structure and shape, as long as the stopper body 31 can come in contact with the assembling bump 6. The stopper body 31 may have various shapes such as plate, bar, and pin. When an inclined guide part which is inclined to be spaced from the assembling bump 6 toward the bottom is formed at the end of the stopper body 31, the stopper body 31 may be smoothly slid upward over the assembling bump 6, even in a state where the top surface of the assembling bump 6 is positioned at a higher level than the bottom surface of the stopper body 31.

The actuator 32 may reciprocate the stopper body 31 between the inside and outside of the first stopper installation part 28. In the present embodiment, the actuator 32 may have a cylinder structure which reciprocates a piston using hydraulic pressure or air pressure, and the piston and the stopper body 31 may be integrally connected to each other. When a cylinder is applied as the actuator 32, the piston may be reciprocated according to the pressure formed in the actuator 32. At this time, the stopper body 31 may be reciprocated at the same displacement as the piston.

The actuator 32 in accordance with the embodiment of the present invention may have a cylinder structure. However, as long as the actuator 32 can move the stopper body 31, the actuator 32 is not limited to a specific structure and shape. For example, the actuator 32 may include a ball screw, a linear guide, a rack pinion gear and the like.

Since the second movement prevention stopper 40 has the same structure as the first movement prevention stopper 30 including the stopper body 31 and the actuator 32, the duplicated descriptions thereof are omitted herein.

Referring to FIGS. 1 and 2, the movement/rotation device 50 in accordance with the embodiment of the present invention may include a rotating shaft 51, a movement device 52, and a rotation device 53.

The rotating shaft 51 is an element which transfers rotational power to the rotating mold 20. The rotating shaft 51 may be extended in the vertical direction, and have an end connected to the rotating mold 20 through the lower mold 10 or the upper mold 60. The movement device 52 may move the rotating shaft 51 in the vertical direction such that the rotating mold 20 comes in contact with the lower mold 10 or is separated from the lower mold 10. The movement device 52 may include various devices such as cylinder, ball screw, linear guide, and rack pinion gear, which generate a linear displacement.

The rotation device 53, which rotates the rotating shaft 51, may rotate the rotating mold 20 such that the first and second middle mold parts 20A and 20B alternately come in contact with the first and second lower mold parts 10A and 10B. When the first and second middle mold parts 20A and 20B are arranged to face each other with an angle difference of 180° based on the center of rotation of the rotating mold 20, the rotation device 53 may repetitively rotate the rotating mold 20 by 180°. The rotation device 53 may include a motor which generates a rotational displacement.

Referring to FIGS. 1 and 2, the upper mold 60 in accordance with the embodiment of the present invention may include an upper disk 61, a first upper core 62, an upper bump molding part 63, a second upper core 64, and a fixing part 65.

The upper disk 61 is an element forming a base in which the first and second upper cores 62 and 64 are installed. The first upper core 62, which forms the first upper mold part 60A, may be installed on the upper disk 61 such that the bottom thereof is exposed. The lower part of the first upper core 62 may have a shape corresponding to the upper part of the primary molded lens part 4.

The upper bump molding part 63 may form an injection molding surface corresponding to the top surface of the assembling bump 6 in a state where the rotating mold 20 is connected to the first upper core 62 of the upper mold 60. The upper bump molding part 63 may be formed at the edge part of the first upper mold part 60A. Specifically, the upper bump molding part 63 may be positioned right above the assembling bump molding part 24 while protruding downward. The upper bump molding part 63 may have a ring shape corresponding to the ring-shaped assembling bump molding part 24. In embodiments, the upper bump molding part 63 may have a shape corresponding to the top of the assembling bump 6, and be arranged to face the assembling bump molding part 24 of the first or second middle mold part 20A or 20B.

The second upper core 64, which forms the second upper mold part 60B, may be arranged on the upper disk 61 so as to be separated from the first upper core 62. The first upper core 62 and the second upper core 64 may be positioned right above the first lower core 12 and the second lower core 15, respectively. The lower part of the second upper core 64 may have a shape corresponding to the upper part of the secondary molded lens part 5.

The fixing part 65 may be placed against the top surface of the assembling bump 6 in a state where the rotating mold 20 is connected to the second upper core 64 of the upper mold 60. Like the upper bump molding part 63, the fixing part 65 may be formed at the edge part of the second upper mold part 60B. Specifically, the fixing part 65 may be positioned right above the assembling bump molding part 24 while protruding downward. The fixing part 65 may have a ring shape corresponding to the ring-shaped upper bump molding part 63. The plurality of fixing parts 65 may be arranged at positions corresponding to the upper bump molding parts 63 so as to be separated from each other.

When the rotating mold 20 and the upper mold 60 are connected to each other, the fixing part 65 may be placed against the top surface of the assembling bump 6, and reliably fix the primary injection-molded product 2A at a normal position of the rotating mold 20. Thus, a secondary injection molding process may be stably performed, which includes injecting a molten injection material into a molding chamber 70 in a state where the lower mold 10, the rotating mold 20 and the upper mold 60 are connected to each other.

Referring to FIG. 2, the first lower mold part 10A and the first middle mold part 20A (or the second middle mold part 20B) may form a hollow first lower molding chamber 71A corresponding to the lower part of the primary molded lens part 4 and the shape of the assembling bump 6, and the first upper mold part 60A may form a hollow first upper molding chamber 71B corresponding to the upper shape of the primary molded lens part 4, in a state where the lower mold 10, the rotating mold 20, and the upper mold 60 are connected to each other. Furthermore, the first lower molding chamber 71A and the first upper molding chamber 71B may form a hollow first molding chamber 71 corresponding to the entire shape of the primary injection-molded product 2A including the primary molded lens part 4 and the assembling bump 6.

At this time, the second lower mold part 10B and the second middle mold part 20B (or the first middle mold part 20A) may form a hollow secondary lower molding chamber 72A corresponding to the lower part of the secondary molded lens part 5 and the shape of the assembling bump 6, and the second upper mold part 60B may form a hollow second upper molding chamber 72B corresponding to the upper shape of the secondary molded lens part 5. Furthermore, the secondary lower molding chamber 72A and the second upper molding chamber 72B may form a hollow second molding chamber 72 corresponding to the entire shape of the secondary injection-molded product 2B including the primary molded lens part 4 and the secondary molded lens part 5.

Next, a method for manufacturing a lens 2 through multi-injection molding, using the apparatus 1 for molding a lens for a vehicle lamp in accordance with the embodiment of the present invention, will be described.

Figure 3:
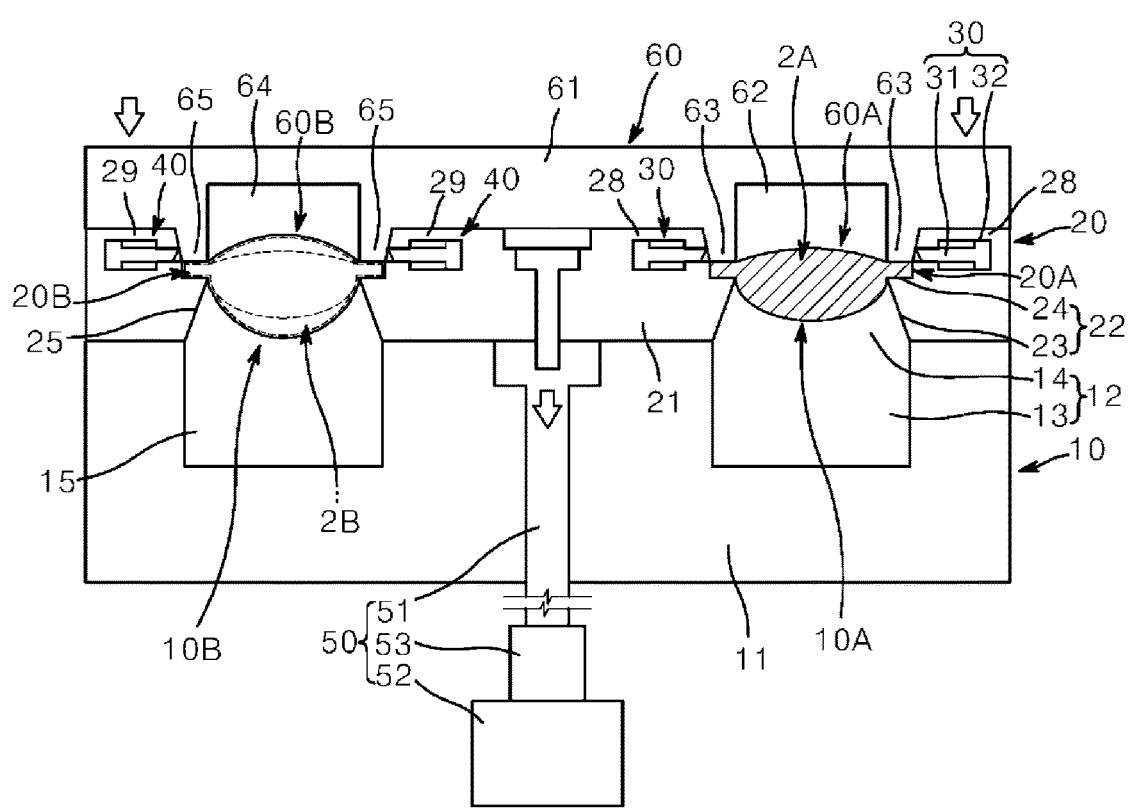
FIG. 3 is a conceptual view for describing a process of forming a primary injection-molded product in a state where the upper mold, the rotating mold and the lower mold are connected to each other in the apparatus for molding a lens for a vehicle lamp in accordance with the embodiment of the present invention.

As illustrated in FIG. 3, a molten injection material may be injected into the first molding chamber 71 and cooled to form the primary injection-molded product 2A, in a state where the lower mold 10, the rotating mold 20, and the upper mold 60 are connected to each other. Then, when the upper mold 60 is separated from the rotating mold 20 as illustrated in FIG. 4, the top of the rotating mold 20 and the top of the primary injection-molded product 2A may be exposed.

Figure 5:
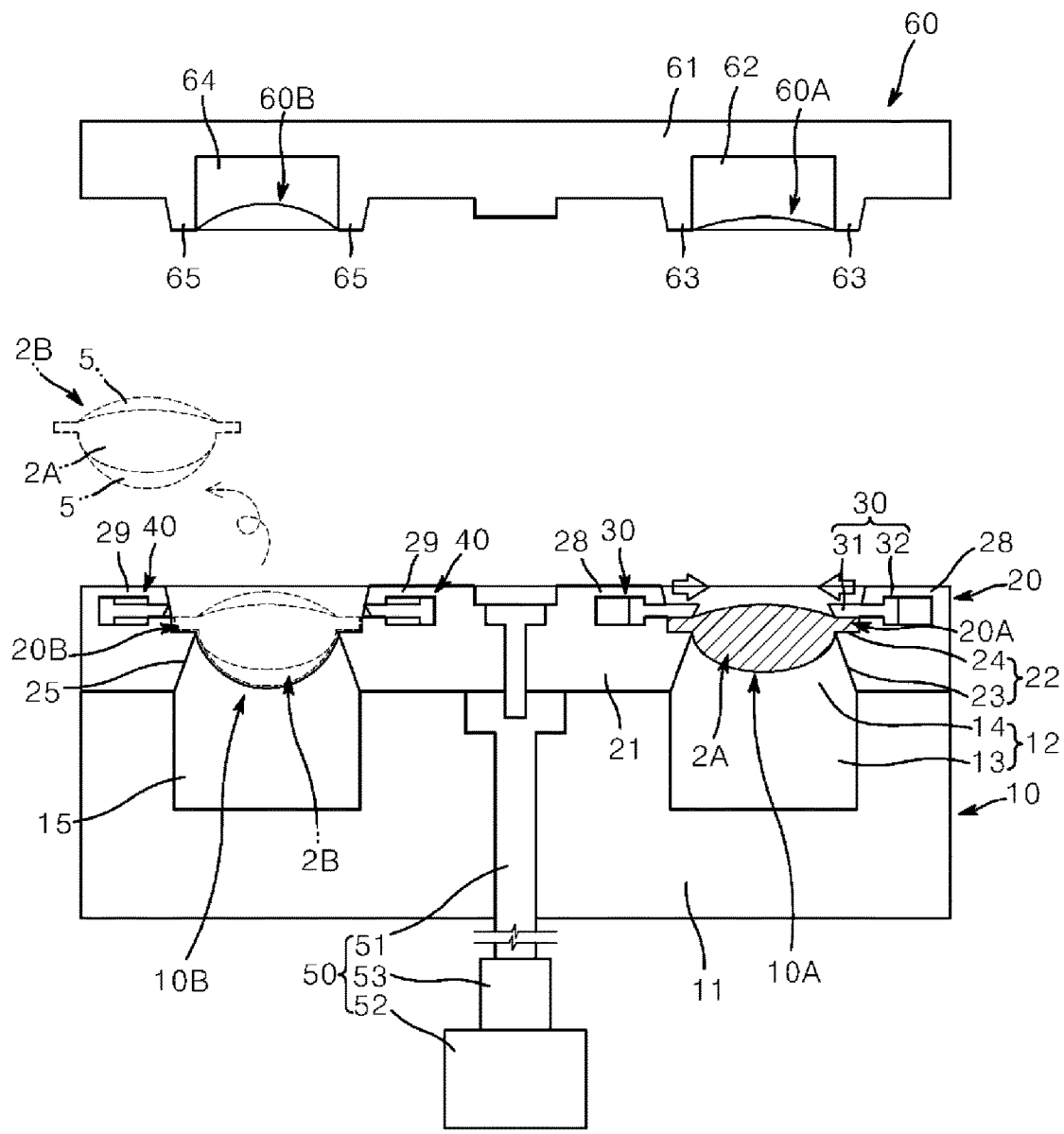
FIG. 5 is a conceptual view illustrating a state in which a first movement prevention stopper is advanced in the apparatus for molding a lens for a vehicle lamp in accordance with the embodiment of the present invention.

Then, as illustrated in FIG. 5, the stopper body 31 of the first movement prevention stopper 30 may be slid to come in contact with the primary injection-molded product 2A, and fix the primary injection-molded product 2A to the rotating mold 20. At this time, the assembling bump 6 may be in contact with the bottom surface of the stopper body 31, and pressurized downward toward the rotating mold 20 by the stopper body 31, in a state where the stopper body 31 is moved toward the primary injection-molded product 2A.

At this time, while the assembling bump 6 is pressurized downward at the plurality of spots by the plurality of stopper bodies 31, the assembling bump 6 may be reliably seated on the entire assembling bump molding part 24. When the assembling bump 6 is placed against the rotating mold 20 by the stopper body 31, slight movement and rotation of the assembling bump 6 may be prevented in the vertical and horizontal directions. In the present embodiment, when the primary injection-molded product 2A is referred to as being restricted in order to prevent a sway or movement of the primary injection-molded product 2A, it may indicate that the primary injection-molded product 2A is fixed.

Figure 6:
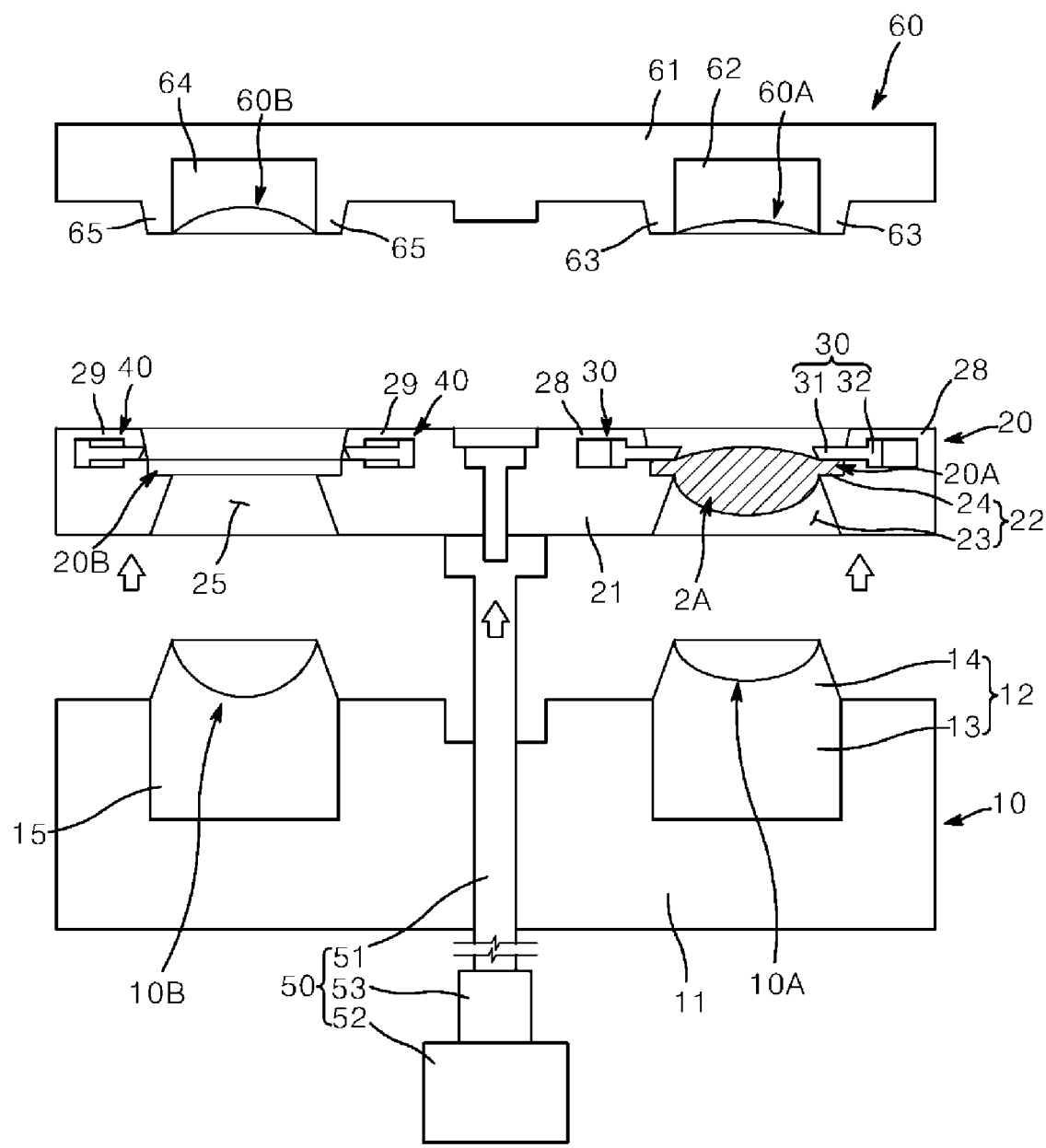
FIG. 6 is a conceptual view illustrating a state in which the rotating mold is separated from the lower mold in the apparatus for molding a lens for a vehicle lamp in accordance with the embodiment of the present invention.

Then, the movement device 52 of the movement/rotation device 50 may be driven to separate the rotating mold 20 from the lower mold 10, as illustrated in FIG. 6. At this time, the assembling bump 6 of the primary injection-molded product 2A may maintain the state in which the assembling bump 6 is seated on the assembling bump molding part 24 of the rotating mold 20.

Figure 7:
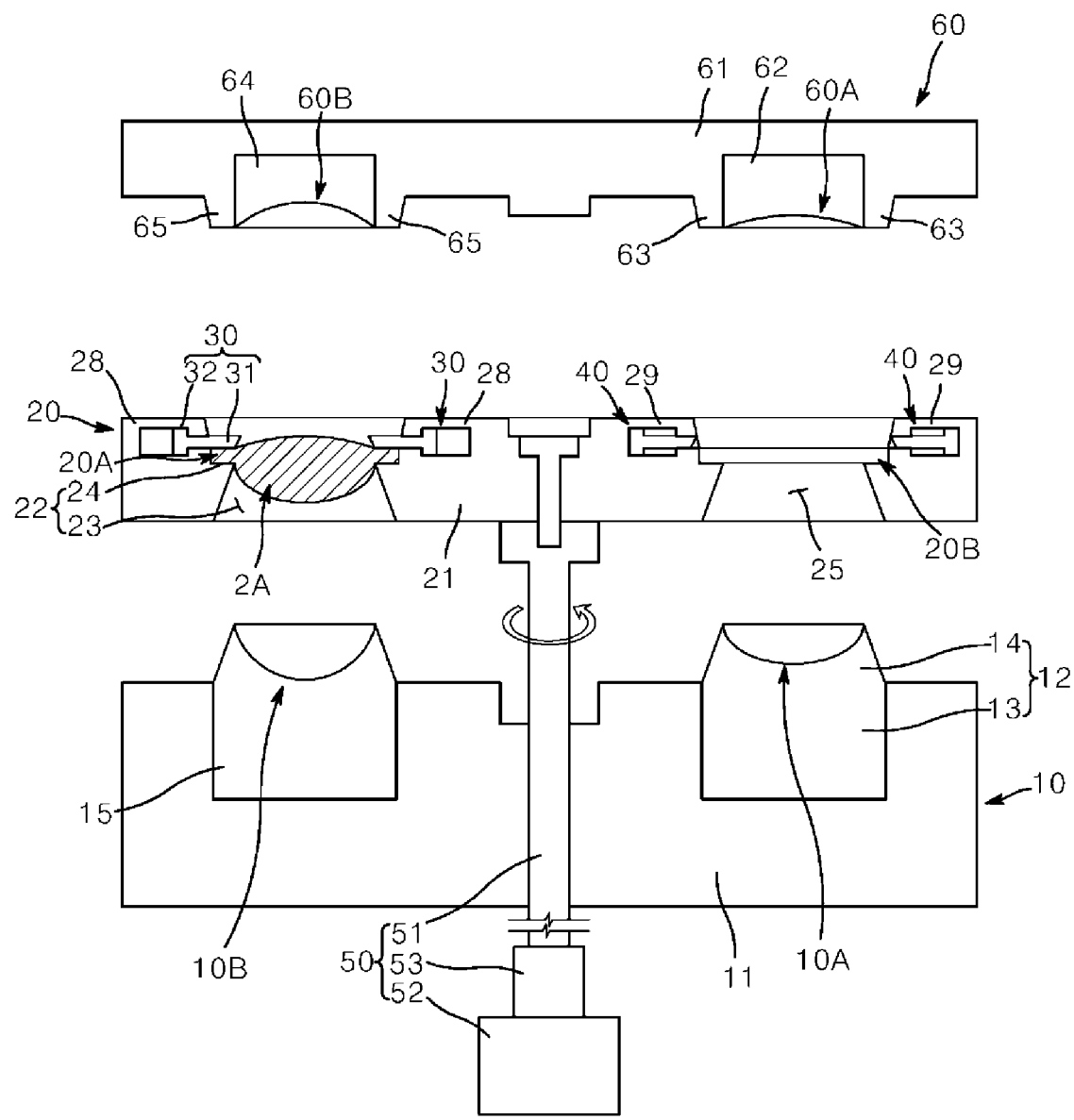
FIG. 7 is a conceptual view illustrating a state in which the rotating mold is rotated to move the position of the primary injection-molded product in the apparatus for molding a lens for a vehicle lamp in accordance with the embodiment of the present invention.
Figure 8:
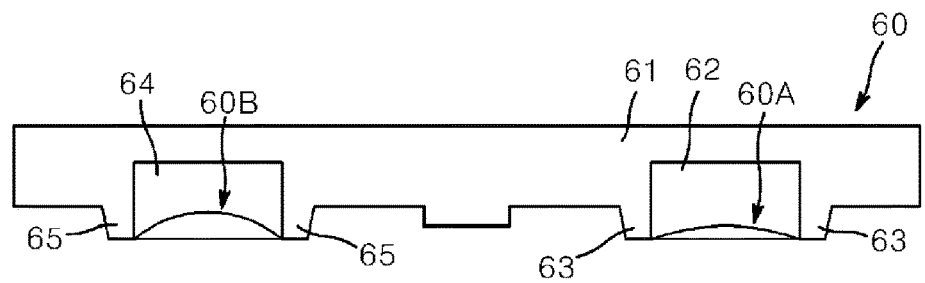
FIG. 8 is a conceptual view illustrating a state in which the rotating mold is connected to the lower mold in the apparatus for molding a lens for a vehicle lamp in accordance with the embodiment of the present invention.
Figure 8:
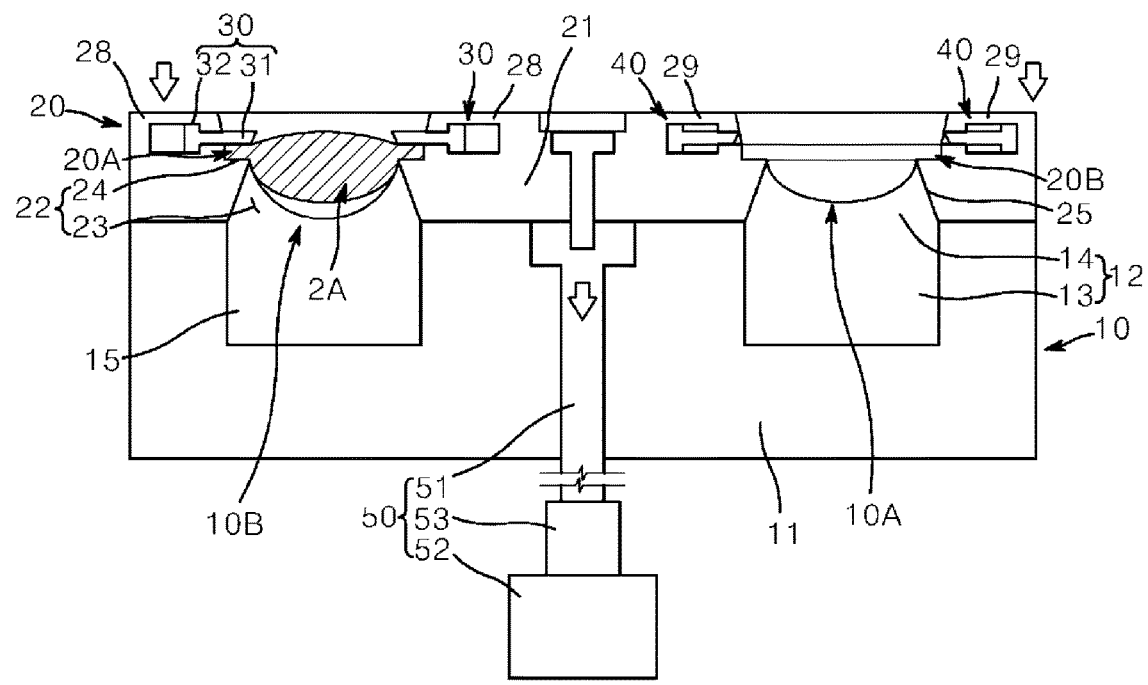

Then, when the rotation device 53 of the movement/rotation device 50 is driven to rotate the rotating mold 20 by a half rotation as illustrated in FIG. 7, the primary injection-molded product 2A may be moved by a displacement angle of 180° in a state where the primary injection-molded product 2A is locked to the assembling bump 6 and hanged on the rotating disk 21, and positioned between the second lower core 15 and the second upper core 64. Then, as illustrated in FIG. 8, the rotating mold 20 may be lowered and connected to the lower mold 10.

Figure 9:
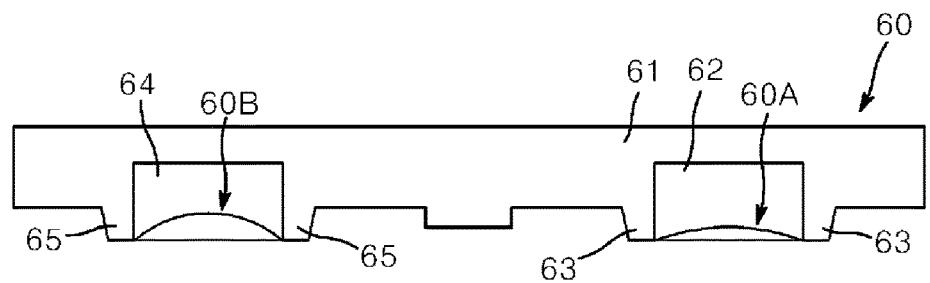
FIG. 9 is a conceptual view illustrating a state in which the first movement prevention stopper is retreated in the apparatus for molding a lens for a vehicle lamp in accordance with the embodiment of the present invention.
Figure 9:
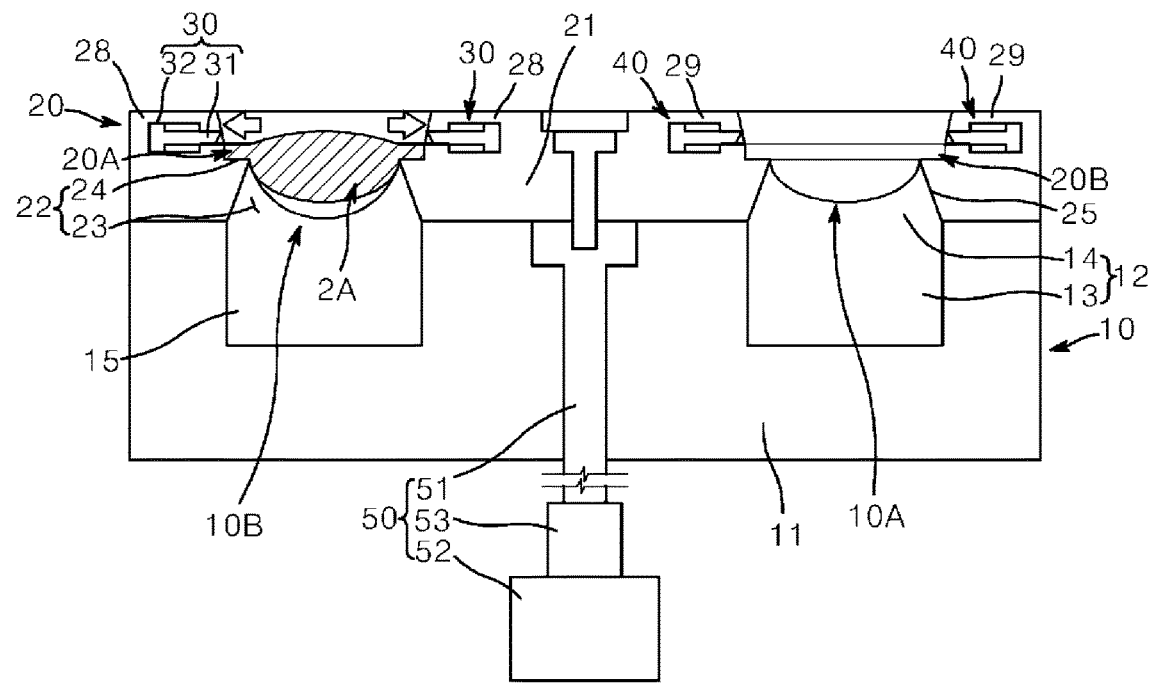

Then, when an operation of connecting the upper mold 60 and the rotating mold 20 is performed, for example, when an operation of lowering the upper mold 60 toward the rotating mold 20 is performed, the stopper body 31 may be retreated from the primary injection-molded product 2A as illustrated in FIG. 9. Thus, the restriction of the primary injection-molded product 2A by the stopper body 31 may be released.

Figure 10:
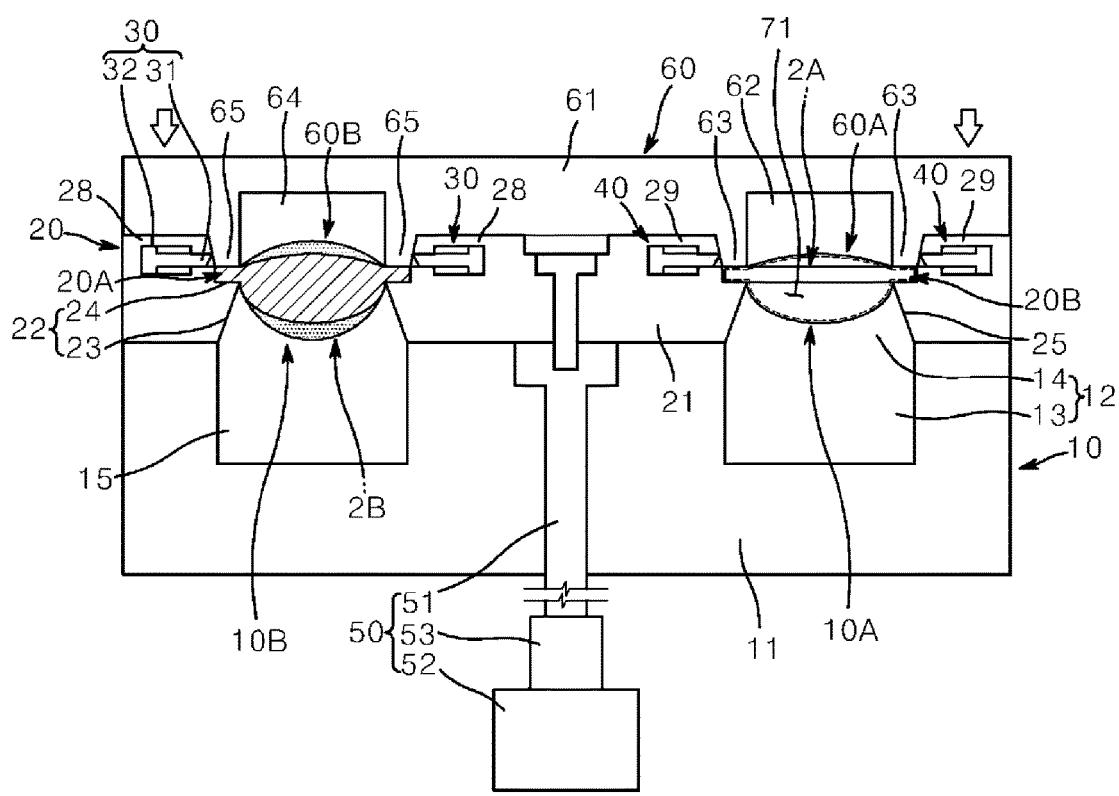
FIG. 10 is a conceptual view for describing a process of forming a secondary injection-molded product in a state in which the upper mold, the rotating mold and the lower mold are connected to each other in the apparatus for molding a lens for a vehicle lamp in accordance with the embodiment of the present invention.

Then, when the operation of connecting the upper mold 60 and the rotating mold 20 is continued, for example, when the operation of lowering the upper mold 60 toward the rotating mold 20 is maintained, the fixing part 65 formed at the bottom of the upper mold 60 so as to protrude downward may be naturally placed against the assembling bump 6 of the primary injection-molded product 2A as illustrated in FIG. 10. Thus, a separate actuator does not need to be operated, or an external force does not need to be additionally applied.

In embodiments, when the connection between the upper mold 60 and the rotating mold 20 is completed, the fixing part 65 may pressurize the assembling bump 6 downward toward the lower mold 10. At this time, the fixing part 65 may be connected to the top surface of the assembling bump 6 while being moved to the position where the stopper body 31 had been placed before the stopper body 31 was retreated.

The primary injection-molded product 2A may be pressurized by the ring-shaped fixing part 65 or the plurality of fixing parts 65 and reliably placed against the assembling bump molding part 24. Thus, the secondary injection process may be stably performed, which includes injecting a molten injection material into the second molding chamber 72 in a state where the lower mold 10, the rotating mold 20, and the upper mold 60 are connected to each other.

Figure 11:
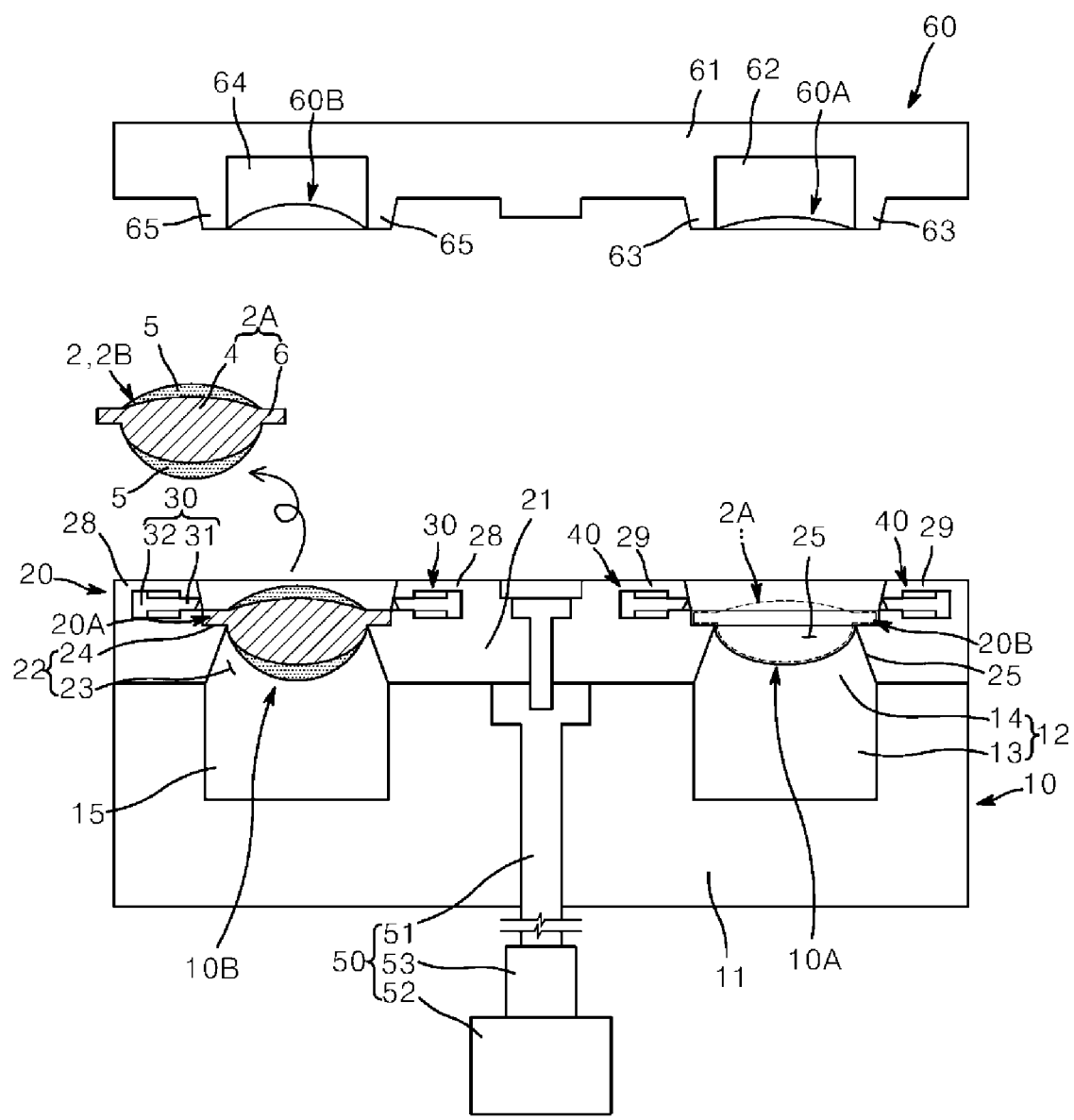
FIG. 11 is a conceptual view for describing a process of ejecting the secondary injection-molded product in the apparatus for molding a lens for a vehicle lamp in accordance with the embodiment of the present invention.

After the molten injection material is injected into the second molding chamber 72 and cooled to form the secondary injection-molded product 2B, the upper mold 60 may be moved upward to separate the rotating mold 20 and the upper mold 60 from each other, and the secondary injection-molded product 2B may be ejected from the rotating mold 20, as illustrated in FIG. 11.

While the primary injection process, the moving process, the secondary injection process and the ejection process are performed in the first middle mold part 20A, the secondary injection process, the moving process and the primary injection process may be performed in the second middle mold part 20B at the same time. These processes are indicated by dotted lines in FIGS. 3 to 11.

Referring to FIG. 3, while a molten injection material is injected into the first molding chamber 71 so as to form the primary injection-molded product 2A, a molten injection material may be injected into the second molding chamber 72 so as to form the secondary injection-molded product 2B. Furthermore, while the secondary injection-molded product 2B is cooled, the primary injection-molded product 2A may be cooled at the same time.

Furthermore, in order to separate the rotating mold 20 form the lower mold 10, the secondary injection-molded product 2B may be ejected from the second middle mold part 20B in a state where the upper mold 60 is separated from the rotating mold 20 as illustrated in FIGS. 4 and 5. Furthermore, while a molten injection material is injected into the second molding chamber 72 to form the secondary injection-molded product 2B as illustrated in FIG. 10, a molten injection material may also be injected into the first molding chamber 71 to form the primary injection-molded product 2A at the same time.

The apparatus 1 for molding a lens for a vehicle lamp in accordance with the embodiment of the present invention may rotate the rotating mold 20 to move the primary injection-molded product 2A to the secondary injection molding position after the primary injection-molded product 2A is formed in a state where the lower mold 10, the rotating mold 20 and the upper mold 60 are connected to each other. Thus, the secondary injection-molded product 2B may be successively formed without a process of ejecting the primary injection-molded product 2A to the outside.

Thus, the apparatus 1 for molding a lens for a vehicle lamp in accordance with the embodiment of the present invention can omit a series of processes of ejecting the primary injection-molded product 2A manufactured in the primary injection mold, storing the primary injection-molded product, transferring the primary injection-molded product 2A to the secondary injection mold, and seating and fixing onto the secondary injection mold, during the existing multi-injection molding process, which makes it possible to significantly reduce the multi-injection molding process and time required for manufacturing a lens.

Furthermore, the assembling bump 6 of the primary injection-molded product 2A may have the same shape as the assembling bump molding part 24 of the rotating mold 20, and the assembling bump 6 may be stably placed against the assembling bump molding part 24 by an adhesive force of the molten and cooled injection material. Furthermore, the primary injection-molded product 2A may be stably fixed to the mold through the first or second movement prevention stopper 30 or 40. Thus, the primary injection-molded product 2A may be stably seated at the normal position of the rotating mold 20 without being moved when the rotating mold 20 is moved and rotated.

Thus, the apparatus 1 for molding a lens for a vehicle lamp in accordance with the embodiment of the present invention can omit a series of processes of forming a flange part with a hole or pin at the edge part of the primary injection-molded product 2A in order to fix the primary injection-molded product 2A to the secondary injection mold, and removing the flange part after the multi-injection molding process. Therefore, a waste of raw material used for the flange part can be prevented, and the manufacturing yield can be improved because the process for removing the flange part is omitted.

Furthermore, the flange part with a hole or pin may be formed at the edge part of the primary injection-molded product 2A, which makes it possible to prevent the primary injection-molded product 2A from being unstably seated in the secondary injection mold due to contraction or deformation of the flange part or a processing error of the mold. Thus, the apparatus 1 for molding a lens for a vehicle lamp can prevent a molding defect which may occur when the primary injection-molded product 2A is unstably seated or moved, and reduce variations in quality among products.

Furthermore, the apparatus 1 for molding a lens for a vehicle lamp can omit the process of correcting the shape of the mold or lens 2 to compensate for a defect caused by contraction and deformation of the flange part. Furthermore, the apparatus 1 for molding a lens for a vehicle lamp can prevent variations in quality among products, which occurred even though the shape of the mold or lens 2 was improved, such that the molding quality and the optical performance of the lens 2 are uniformly exhibited.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A method for manufacturing a lens for a vehicle lamp, comprising:
    arranging a lower mold, a rotating mold, and an upper mold in a vertical direction;
    connecting the lower mold, the rotating mold, and the upper mold;
    forming a primary injection-molded product by injecting a molten injection material into a first molding chamber formed by a first injection molding surface of the lower mold, an injection molding surface of the rotating mold, and a first injection molding surface of the upper mold;
    fixing the primary injection-molded product to the rotating mold by moving a movement prevention stopper installed in the rotating mold such that the movement prevention stopper comes in contact with the primary injection-molded product;
    separating the upper mold and the lower mold from the rotating mold;
    rotating the rotating mold to move the primary injection voided product to a position between a second injection molding surface of the lower mold and a second injection molding surface of the upper mold;
    connecting the lower mold, the rotating mold, and the upper mold such that the primary injection-molded product is positioned in a second molding chamber formed by the second injection molding surface of the lower mold, the injection molding surface of the rotating mold and the second injection molding surface of the upper mold; and
    forming a secondary injection-molded product by injecting a molten injection material into the second molding chamber while the primary-injection molded product is positioned in the second molding chamber.

2. The method of claim 1, wherein the fixing of the primary injection-molded product to the rotating mold comprises:
    exposing the top of the primary injection-molded product by separating the upper mold from the rotating, mold; and sliding the movement prevention stopper to come in contact with the top of the primary injection-molded product.

3. The method of claim 1, wherein the connecting of the lower mold, the rotating mold, and the upper mold such that the primary injection-molded product is positioned in the second molding chamber comprises:

lowering the rotating mold to be connected to the lower mold;

retreating the movement prevention stopper from the primary injection-molded product; and connecting the upper mold to the rotating mold.

4. The method of claim 1, wherein the rotating of the rotating mold comprises:

separating the rotating mold from the lower mold; and rotating the rotating mold at a preset angle.

5. The method of claim 1, wherein while the secondary injection-molded product is formed by injecting a molten injection material into the second molding chamber, another primary injection-molded product is simultaneously formed by injecting a molten injection material into the first molding chamber.

* * * * *